United States Patent
Krutz et al.

[15] 3,686,507
[45] Aug. 22, 1972

[54] PULSING MECHANISM

[72] Inventors: Ronald L. Krutz; Thomas J. Villella, both of c/o Gulf Research & Development Company, P.O. Drawer 2038, Pittsburgh, Pa. 15230

[22] Filed: March 3, 1971

[21] Appl. No.: 120,647

Related U.S. Application Data

[62] Division of Ser. No. 815,838, April 14, 1969, Pat. No. 3,589,283.

[52] U.S. Cl. .....................307/106, 335/207, 317/5
[51] Int. Cl. ..............................................H03k 3/00
[58] Field of Search..............307/106, 107, 108, 141; 328/59, 60, 61, 62; 333/20; 335/205, 206, 207; 317/5

[56] References Cited

UNITED STATES PATENTS 3,514,729   5/1970   Webb ..........................335/207
3,417,289   12/1968  Jensen .................307/106 UX

*Primary Examiner*—Herman J. Hohauser
*Attorney*—Meyer Neishloss, Deane E. Keith and William Kovensky

[57] ABSTRACT

An improved device for transforming shaft rotation into a predetermined number of electrical pulses per shaft revolution, with means to prevent the creation of spurious pulses at the electrical pulse generator.

7 Claims, 2 Drawing Figures

Patented Aug. 22, 1972

3,686,507

INVENTORS.
RONALD L. KRUTZ
THOMAS J. VILLELLA

3,686,507

PULSING MECHANISM

This application is a division of copending application Ser. No. 815,838, filed Apr. 14, 1969, entitled "Gasoline Pump Computer," by the same inventors and assigned to the same assignee as the present invention, and now U.S. Pat. No. 3,589,283.

The invention provides a relatively simple apparatus for use in converting shaft rotation or other similar cyclic movement to electrical pulses. In the above identified parent patent, the circuit requires a predetermined number of electrical pulses per unit volume of gasoline passing through the pump, and the present invention produces 100 electrical pulses per gallon. An advantage of the present invention is that it is exceedingly simple in design, construction, and manner of installation into existing pump housings. 100 pulses per gallon was chosen in conjunction with the nature of that circuit because this number is decimal, is easily handled, and produces a commercially acceptable accuracy. As will appear below, the invention can be used to produce any number of pulses. Since that parent circuit is in the nature of a digital computer, each pulse is handled separately, and therefore an error of one or two pulses, corresponding to an error of 1 or 2 percent, only amounts to an error of 1 or 2 1/100's of a gallon, or that fraction of the price of a gallon in terms of money. Prior known devices produce a number of pulses substantially larger than 100 per gallon. This larger number of pulses is more difficult to handle in the circuit, or else requires means in the circuit to reduce the number of pulses operated upon to a number of the same order of magnitude as 100.

Another feature of the pulser of the invention is the inclusion of an array of reed switches and magnets to directly produce the pulses for, and at the voltage required by the circuit being serviced, or by any other point of use. Use of the reed switch array permits production of a relatively high voltage pulse, in the range of about 3 to 5 volts, directly. Of course, lower voltages can be handled by proper choice of the reed switches. Certain known prior devices produce a very low voltage pulse, of the order of magnitude of 10 millivolts. Several disadvantages are inherent in the use of such low voltage pulses. Firstly, it often must be amplified to be useful. This requires the use of additional circuit elements to filter and amplify the pulse, thus further complicating the circuit and increasing its cost. Additionally, such a low voltage, high frequency series of pulses are susceptible to interference from many sources, such as the electrical systems of vehicles. Such interference can damage the circuitry or at least result in false counting. Both of these problems are avoided by the apparatus of the invention in that the relatively low frequency high voltage pulses produce are both directly handleable by the circuitry and virtually not susceptible to interference from vehicles or other electrical systems in the vicinity.

The present invention provides a sturdy, reliable, economical, and generally improved pulsing mechanism having wide applicability. The pulser of the invention would most usually be used with a rotating shaft, but as will be evident to those skilled in the art, other types of mechanical motion could be accommodated by minor changes so long as a proportional rotation is produced at the magnet carrying block. The invention could be used as a velocity transducer by measuring the time between pulses to accurately measure the speed of the cyclically moving member. The invention also could be used as a tachometer by counting the pulses and hence the cycles, per unit time. As mentioned above, the pulser of the invention is generally useful in the broad field of fluid dispensing, of which the above identified parent patent is an example. Still another use would be determining location by means of counting rotations. For example, one could determine the cutting tool's location on a computer controlled machine tool by means of accurately counting revolutions of the drive screw for the tool holder. The invention provides the versatility to produce many pulses per revolution whereby the location of the cutting edge can be determined with great accuracy. Other uses will present themselves to those skilled in various arts to which the invention lends itself.

The above and other advantages of the invention will be pointed out or will become evident in the following detailed description and claims, and in the accompanying drawing also forming a part of the disclosure, in which:

Figure 1:
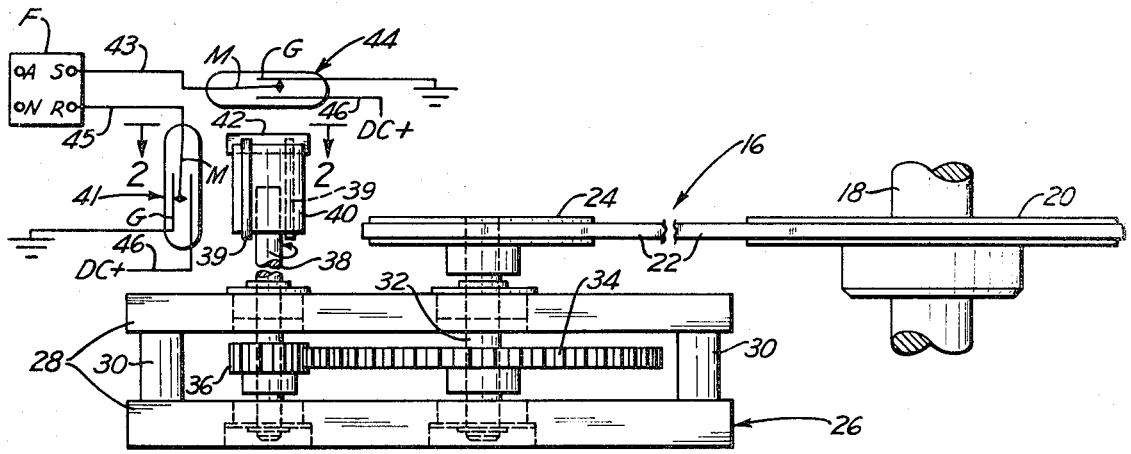
FIG. 1 is a somewhat diagrammatic showing of the pulser of the invention.

Referring now in detail to the drawing, 16 designates an apparatus embodying the invention. Referring to FIG. 1, the overall apparatus 16 includes a shaft 18. Shaft 18 is the only thing shown in FIG. 1 which is already existent in a pump or other installation, the remainder having been added in accordance with the invention. In gasoline dispensing pumps for example, shaft 18 typically rotates at a speed of two revolutions per gallon of gasoline pumped. Added to shaft 18 and fixed thereto is a pulley 20. An endless positive drive belt 22 is trained about pulley 20 and about an input pulley 24 of a gear box 26.

The pulleys 20 and 24 and the belt 22 are matched to provide a positive drive. For example, a toothed belt with suitable pulleys, or a chain and gears, may be provided. In the successfully built embodiment of the invention, a toothed belt was used.

Gear box 26 comprises a pair of supporting members 28 interconnected by cross pieces 30. Input pulley 24 is mounted on a first shaft 32 which is rotatably mounted between the support members 28, and carries a gear 34 therebetween. Gear 34 drivingly engages a pinion 36 mounted on a second shaft 38 rotatably mounted between the support members. At its outer end, shaft 38 carries a mounting block 40.

The remaining portion of the apparatus shown in FIG. 1, described below, provides means to convert the two revolutions per gallon at shaft 18 into 50 revolutions per gallon at shaft 38, to provide 100 electrical pulses per gallon, and to assure that no spurious pulses are introduced.

Figure 2:
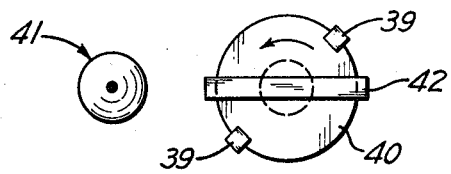
FIG. 2 is a view on line 2—2 of FIG. 1.

To this end, block 40 carries a bar magnet 42 in its free end face, and a pair of bar magnets 39 mounted in its side cylindrical face. The two magnets 39 are offset from each other by 180°, and each one of them leads, in the direction of rotation of block 40 as indicated by the arrow on FIG. 2 of the drawing, an end of magnet 42 by approximately 30°, all for a reason that will be explained below. The plane of rotation of magnet 42 is located closely adjacent to but not in contact with a first magnetically operated reed switch 44. A second reed switch 41 is located closely adjacent but not touching the side surface of block 40 and magnets 39. The nature of the two switches 41 and 44 are that they will close and then open, thus producing an electrical pulse, whenever the magnets, 42 on the one hand and the two magnets 39 on the other hand, are aligned with their respective switches. Switch 44 comprises three terminals, a fixed terminal G which is grounded, a second fixed terminal which is connected to a suitable power supply by a line 46, and a moveable contact M which is connected to a line 43. Switch 41 may be identical to switch 44, and its moveable terminal M is connected to a line 45.

Not shown but also provided is a power supply. The reed switches are preferably D.C. and the power supply includes means to put out direct current at whatever voltage is required by the switches 41 and 44, all in a manner well known to those skilled in the art. In said parent patent, it is significant that the voltage of the current supplied through line 46 to the two switches 41 and 44 is in the range of about 3 to 5 V.D.C., which is large enough to prevent the pulses when handled in the subsequent circuitry from being affected by miscellaneous or stray electrical signals in the area.

In said parent invention, one function of the structure shown in FIG. 1 is to transform the two revolutions per gallon at shaft 18 into 50 revolutions per gallon at shaft 38 and therefore 100 electrical pulses per gallon at switch 44. To this end, pulleys 20 and 24 have a 2 to 1 speed relationship whereby shaft 32 will rotate at 4 revolutions per gallon. Gear 34 has a 12.5 to 1 step-up speed relationship to pinion 36 whereby shaft 38 will rotate at 12-½ times the speed of shaft 32, which is the desired 50 revolutions per gallon. Switch 44 will cycle twice for each full revolution of magnet 42. As is obvious, of course, in the event that some other application is encountered wherein the part equivalent to shaft 18 moves or cycles at some other speed, this may be easily accommodated by adjusting the relationship of the two pulleys 20 and 24, and/or the relationship of the gear 34 to the pinion 36. More generally, it is a simple matter to change any speed at the equivalent of shaft 18 to virtually any number of pulses at switch 44 by adjusting one or both of the speed ratios provided, i.e., pulleys 20 and 24, and gear and pinion 34 and 36.

Means are provided to prevent the creation of extraneous pulses at switch 44. Switch 41 and its associated magnets 39 are utilized for this purpose. Switches 41 and 44 are of the normally open, momentary make type. The moveable contacts M thereof are normally biased towards their respective grounds G, and move onto the supply or "live" terminal only when a magnet is aligned with the switch. For example, in said prior parent invention, one source of spurious pulses is the situation that could occur if the pump should happen to stop in a position wherein the magnet 42 is close to but slightly to either side of the aligned position with its switch 44. Such a happenstance could result in "chatter" in switch 44, that is, repeated cycling of moveable contact M back and forth between its two fixed contacts. Such "chatter" would result in the creation and transmission of many extra pulses which would result in error.

Therefore, to the end of preventing such "chatter" or, generally in any environment, creation of extraneous pulses at switch 44, a solid state binary circuit component F, known in the art as a "flip-flop," is provided. Flip-flop F is of the SET/RESET input variety, i.e., a signal supplied to its set terminal S, via line 43 from switch 44, will cause a signal to be present at its output terminals A and N. The output terminals of this type of flip-flop are of the "ASSERTION/NEGATION " (A,N) type, and are complementary, i.e., are direct opposites of each other. That is, when A is "high," N is "low," and vice versa. Subsequent circuitry could use one or both of terminals A and N depending upon its specific requirements. The nature of device F is that once a signal has been supplied to terminal S the output signal at terminals A and N will hold steady regardless of whatever else occurs at terminal S. Thus, all chatter or the like spurious signals from switch 44 between valid pulses are stopped at flip-flop F. A signal from switch 41 via line 45 supplied to terminal R resets device F, changes the signals at the output terminals, and prepares terminal S for receipt of another valid signal. Thus, the array of magnets and switches shown permit transmission of a valid signal from switch 44 each time magnet 42 is aligned therewith, and then prevents transmission of any additional signals until approximately 120° of rotation of shaft 38 later, (see FIG. 2), at which time one of the magnets 39 will align with switch 41 thereby preparing flip-flop F for receipt of another valid signal from switch 44. Another advantage of this array of flip-flop F and switches 41 and 44 and their associated magnets is that the input to any following circuitry is protected for a total of approximately 240°, or two-thirds of each rotation of block 40 against externally spuriously generated pulses which might come from other sources. Conversely, the input side of the circuit is open to receive pulses for only about one-third of total operating time, and that time is exactly when valid pulses are generated.

The relatively long pulse, proportional to 120° of rotation of shaft 38, produced at the output terminals could be directly utilized in driven circuitry. However, such a long pulse is deemed somewhat undesirable for several reasons in many applications, and in any case is not in accordance with the best and accepted electronic circuit design practices. Therefore, it may be desirable to shorten this pulse, and, additionally, to amplify the shortened pulse before transmitting to the remainder of the circuitry. The amplifying means is optional depending on the physical distance and length of wire between the pulser 16 and the driven circuitry, as is well known to those skilled in this art. To this end, a one-shot multi-vibrator and a line driver can be provided in the well known manner.

While the invention has been described in detail above, it is to be understood that this detailed description is by way of example only, and the protection granted is to be limited only within the spirit of the invention and the scope of the following claims.

We claim:

1. In combination, a cylindrical member mounted for rotation about its axis, a magnet mounted in the free end face of said rotating cylindrical member, a first reed switch in operative cooperation with said first magnet, a pair of magnets mounted in the cylindrical side face of said rotating member, a second reed switch in operative cooperation with said pair of magnets, said magnets of the pair of magnets being offset from each other by about 180° and so located on said cylindrical side face that each magnet of said pair of magnets leads an end of the aligned position said first-mentioned magnet with said first reed switch by an acute angle in the direction of rotation of said rotating member, a flip-flop, means to connect the output of said first reed switch to the SET terminal of said flip-flop, and means to connect the output of said second reed switch to the RESET terminal of said flip-flop.

2. The combination of claim 1, said acute angle comprising approximately 30°.

3. The combination of claim 1, said first and second reed switches comprising normally open reed switches adapted to be closed when their respective magnets are aligned with them.

4. Pulse generating apparatus for use with machinery which produces an output measured in units, said machinery having a member which moves in a cycle and which completes a predetermined number of cycles per unit output, the improvement comprising means to convert said predetermined number of cycles of movement of said member to a predetermined number of pulses, said converting means comprising a speed changer, said speed changer having input means and output means, means to connect said input means of said speed changer to said cyclically moving member of said machinery, said speed changer comprising means to interconnect said input means and said output means of said speed changer, said output means of said speed changer comprising means operatively cooperable with pulse generating means, said pulse generating means including means to prevent the creation of pulses except when said output means of said speed changer is operatively cooperable with said pulse generating means: and the speed relationship of the connecting means between said input means of said speed changer and said cyclically moving member, and the speed relationship internal to said speed changing means interconnecting said input means and said output means both being selected so as to change said predetermined number of cycles to said predetermined number of pulses at said pulse generating means.

5. The combination of claim 4, said speed changing means comprising a gear box.

6. The combination of claim 5, said pulse generating means comprising a reed switch, and said means on the output means of said gear box comprising a magnet operatively cooperable with said reed switch to close and then open said reed switch to thereby produce a pulse each time said magnet is aligned with said reed switch.

7. The combination of claim 6, said preventing means comprising a second reed switch operatively cooperable with a pair of magnets, and said output means of said gear box comprising a cylindrical mounting block which carries all of said magnets.

* * * * *

PO-1050
(5/69)

UNITED STATES PATENT OFFICE
CERTIFICATE OF CORRECTION

Patent No. 3,686,507      Dated August 22, 1972

Inventor(s) Ronald L. Krutz, Thomas J. Villella

It is certified that error appears in the above-identified patent and that said Letters Patent are hereby corrected as shown below:

Column 1, line 6, "3,589,283" should be --3,598,283--.

Signed and sealed this 15th day of May 1973.

(SEAL)
Attest:

EDWARD M. FLETCHER, JR.
Attesting Officer

ROBERT GOTTSCHALK
Commissioner of Patents